United States Patent
Schaffer et al.

(10) Patent No.: US 7,568,365 B2
(45) Date of Patent: Aug. 4, 2009

(54) METHOD AND APPARATUS FOR MICROMACHINING BULK TRANSPARENT MATERIALS USING LOCALIZED HEATING BY NONLINEARLY ABSORBED LASER RADIATION, AND DEVICES FABRICATED THEREBY

(75) Inventors: Chris Schaffer, La Jolla, CA (US); André Brodeur, Montreal (CA); Rafael R. Gattass, Jamaica Plain, MA (US); Jonathan B. Ashcom, Somerville, MA (US); Eric Mazur, Concord, MA (US)

(73) Assignee: President & Fellows of Harvard College, Cambridge, MA (US)

( * ) Notice: Subject to any disclaimer, the term of this patent is extended or adjusted under 35 U.S.C. 154(b) by 925 days.

(21) Appl. No.: 10/136,160

(22) Filed: May 1, 2002

(65) Prior Publication Data
US 2002/0162360 A1    Nov. 7, 2002

Related U.S. Application Data

(60) Provisional application No. 60/288,890, filed on May 4, 2001.

(51) Int. Cl.
*C03B 32/00* (2006.01)
(52) U.S. Cl. ............... 65/377; 65/386; 65/392; 430/290; 430/321; 250/492.1
(58) Field of Classification Search ............ 65/386, 65/392, 377; 430/290, 321; 250/492.1
See application file for complete search history.

(56) References Cited

U.S. PATENT DOCUMENTS

| | | | |
|---|---|---|---|
| 5,720,894 A | 2/1998 | Neev et al. | |
| 5,761,111 A | 6/1998 | Glezer | |
| 5,786,560 A | 7/1998 | Tatah et al. | |
| 5,978,538 A | 11/1999 | Miura et al. | |
| 6,020,988 A | 2/2000 | Deliwala et al. | |
| 6,110,166 A | 8/2000 | Juhasz | |
| 6,154,593 A | 11/2000 | Miura et al. | |
| 6,156,030 A | 12/2000 | Neev | |
| 6,833,922 B2 * | 12/2004 | DiDomenico et al. | ....... 356/437 |

* cited by examiner

Primary Examiner—John Hoffmann
(74) Attorney, Agent, or Firm—Thomas J. Engellenner; Reza Mollaaghababa; Nutter McClennen & Fish LLP

(57) ABSTRACT

Thermal 3-D microstructuring of photonic structures is provided by depositing laser energy by non-linear absorption into a focal volume about each point of a substrate to be micromachined at a rate greater than the rate that it diffuses thereout to produce a point source of heat in a region of the bulk larger than the focal volume about each point that structurally alters the region of the bulk larger than the focal volume about each point, and by dragging the point source of heat thereby provided point-to-point along any linear and non-linear path to fabricate photonic structures in the bulk of the substrate. Exemplary optical waveguides and optical beamsplitters are thermally micromachined in 3-D in the bulk of a glass substrate. The total number of pulses incident to each point is controlled, either by varying the rate that the point source of heat is scanned point-to-point and/or by varying the repetition rate of the laser, to select the mode supported by the waveguide or beamsplitter to be micromachined. A wide range of passive and active optical and other devices may be thermally micromachined.

10 Claims, 6 Drawing Sheets

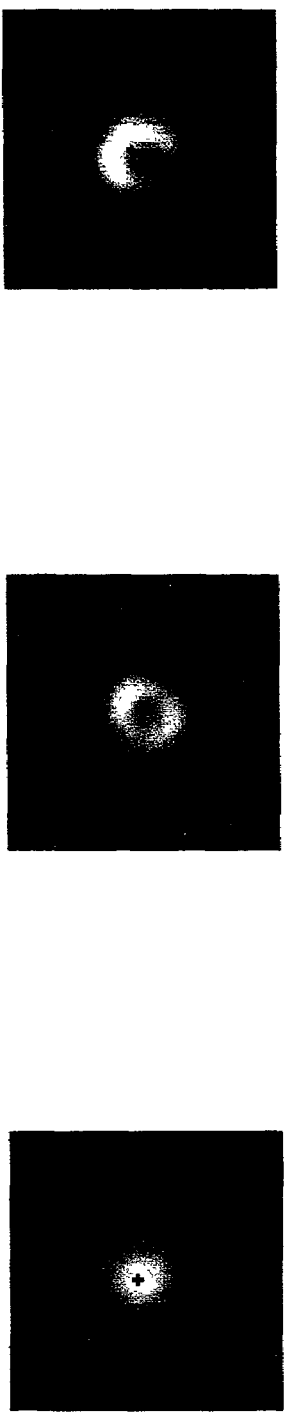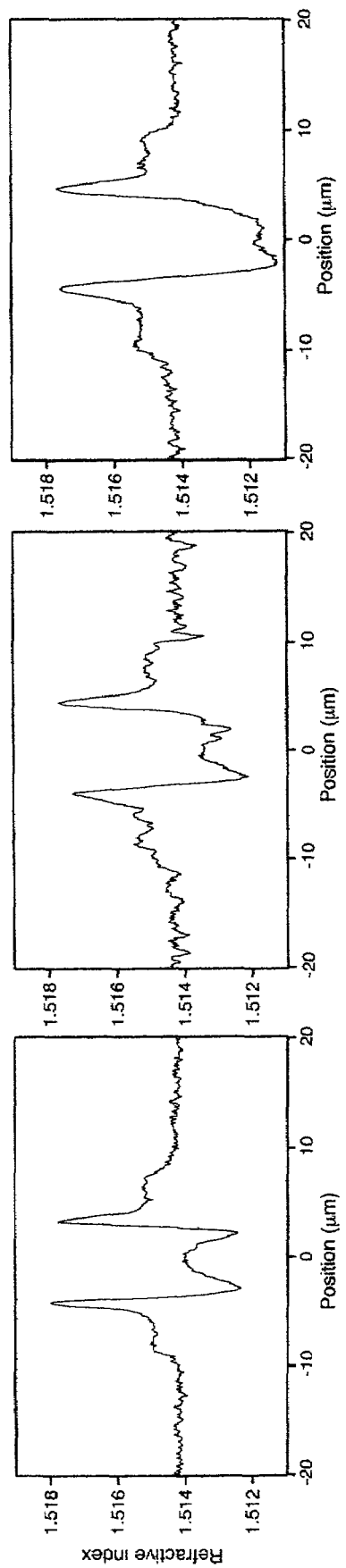
FIG. 6A  FIG. 6C  FIG. 6E
FIG. 6B  FIG. 6D  FIG. 6F

METHOD AND APPARATUS FOR MICROMACHINING BULK TRANSPARENT MATERIALS USING LOCALIZED HEATING BY NONLINEARLY ABSORBED LASER RADIATION, AND DEVICES FABRICATED THEREBY

CROSS-REFERENCE TO RELATED APPLICATIONS

This invention is related to U.S. provisional application of Schaffer et al., Ser. No. 60/288,890, filed May 4, 2001, and incorporated herein by reference.

STATEMENT OF GOVERNMENT INTEREST

The U.S. government may have rights in the present invention under contract numbers DMR-94-00396 and DMR-98-09363 from the National Science Foundation.

FIELD OF THE INVENTION

This invention is drawn to the field of laser micromachining, and more particularly, to a novel method and apparatus for thermal three-dimensional micromachining of bulk transparent materials using nonlinear absorption of laser radiation, and devices fabricated thereby.

BACKGROUND OF THE INVENTION

In recent years, optical breakdown induced in transparent materials by femtosecond laser pulses, and its application to micromachining, have received much attention. As to the former, optical breakdown induced in transparent materials by femtosecond laser pulses, reference may be had, for example, to an article by Du et al. entitled "Laser-Induced Breakdown by Impact Ionization in $SiO_2$ with Pulse Widths from 7 ns to 150 fs," appearing at Appl. Phys. Lett. 64, 3071 (1994), to an article by Stuart et al. entitled "Optical Ablation by High-Power Short-Pulse Lasers," appearing at J. Opt. Soc. Am. B 13, 459 (1996), to an article by Lenzner et al. entitled "Femtosecond Optical Breakdown in Dielectrics," appearing at Phys. Rev. Lett. 80, 4076 (1998), and to an article by Schaffer, et al. entitled "Laser-Induced Breakdown and Damage in Bulk Transparent Materials Induced by Tightly-Focused Femtosecond Laser Pulses," appearing at Meas. Sci. Technol. 12, 1784 (2001), each incorporated herein by reference. As to the latter, the application to micromachining, reference may be had, for example, to an article by Varel et al. entitled "Micromachining Quartz with Ultrashort Laser Pulses," appearing at Appl. Phys. A. 65, 367 (1997), an article by Glezer et al. entitled "Three-Dimensional Optical Storage Inside Transparent Materials," appearing at Opt. Lett. 21, 2023 (1996), to another article by Glezer et al. entitled "Ultrafast-Laser Driven Micro-Explosions in Transparent Materials," appearing at Appl. Phys. Lett. 71, 882 (1997), to an article by Schaffer et al., entitled "Laser Induced Microexplosions in Transparent Materials: Microstructuring with Nanojoules," appearing at Proc. SPIE 3616, 143 (1999), to an article also by Schaffer et al. entitled "Microscopic Bulk Damage in Dielectric Materials Using Nanojoule Femtosecond Laser Pulses," appearing at OSA Technical Digest: Quantum Electronics and Laser Science Conference 99, 232 (1999), to an article by Davis et al. entitled "Writing Waveguides in Glass with a Femtosecond Laser," appearing at Opt. Lett. 21, 1729 (1996), to an article by Miura et al. entitled "Photowritten Optical Waveguides in Various Glasses with Ultrashort Pulse Laser," appearing at Appl. Phys. Lett. 71, 3329 (1997), to another article by Schaffer et al. entitled "Micromachining Optical Waveguides in Bulk Glass Using a Femtosecond Laser Oscillator," appearing at OSA Technical Digest: Conference on Lasers and Electro Optics 375 (2000), to an article by Homoelle et al. entitled "Infrared Photosensitivity in Silica Glasses Exposed to Femtosecond Laser Pulses," appearing at Opt. Lett. 24, 1311 (1999), to another article by Schaffer, et al. entitled "Micromachining Bulk Glass by Use of Femtosecond Laser Pulses with Nanojoule Energy," appearing at Opt. Lett. 26, 93 (2000), and to an article by Minoshima, et al. entitled "Photonic Device Fabrication in Glass by Use of Nonlinear Materials Processing with a Femtosecond Laser Oscillator," appearing at Opt. Lett. 26, 1516 (2001), each incorporated herein by reference.

When a femtosecond laser pulse is focused inside the bulk of a transparent material, the intensity in the focal volume can become high enough to cause absorption through non-linear processes, leading to optical breakdown in the material. See, in this connection, the articles by Du et al., Stuart et al. and Lenzner et al., supra. Because the absorption is strongly non-linear, this breakdown can be localized in the focal volume inside the bulk of the material, leaving the surface unaffected. See, in this connection, the two articles by Glezer et al. and the first three articles by Schaffer et al., supra. The energy deposited in the material produces permanent structural changes in the sample, which can be used to micromachine a three-dimensional (3-D) structure inside the bulk of the sample. See, in this connection, for example, the article by Stuart et al., the two articles by Glezer et al. and the articles by Schaffer et al., supra. Recent demonstrations have included three-dimensional binary data storage as reported by the first Glezer et al. article, and the direct writing of optical waveguides and waveguide splitters as respectively reported by the Davis et al., Miura et al. and the fourth and fifth listed Schaffer et al. articles, supra, and by the Homoelle et al article, supra.

Until now, however, micromachining with femtosecond laser pulses required amplified laser systems that not only were expensive, sometimes unreliable and generally complex, but also those amplified laser systems, operating at kilohertz repetition-rates, severely limited the maximum processing speed for many applications.

In addition, the utility of bulk waveguide laser micromachining techniques has heretofore been limited to fabrication of waveguides or other devices of generally circular cross-section that lie along a geometric straight line in the bulk. Since a waveguide must have a transverse spatial extent of at least several microns to efficiently guide visible or near infrared light, the heretofore known bulk waveguide laser micromachining techniques have generally employed focusing optics with numerical apertures (NA) below 0.25 to produce a focused spot size larger than the several microns necessary in order to fabricate waveguides. See, for example, the article by Homoelle et al., supra. But because the focal volume is significantly elongated in the axial direction with the numerical apertures needed to produce spot sizes larger than the several microns necessary for waveguides, it was heretofore necessary to write the waveguides axially, as transverse linear writing resulted in a waveguide with an elliptical cross-section while transverse non-linear writing resulted in photonic structures of generally nonuniform cross-section. This axial writing, however, limits the writing of waveguides or other devices of generally circular cross-section to structures that lie along a geometric straight line in the bulk, or have very little curvature away from a geometric straight line in the bulk.

SUMMARY OF THE INVENTION

Accordingly, it is the general object of the present invention to disclose a novel method and apparatus for thermal 3-D micromachining using femtosecond laser pulses, and devices fabricated thereby, that is not subject to the disadvantages of the heretofore known bulk laser micromachining techniques.

In accord with one inventive aspect of the present invention, a method for thermal 3-D micromachining of a photonic structure is disclosed that comprises the steps of defining points in the bulk of a substrate to be micromachined; and directing a train of laser pulses, with a wavelength to which the substrate is transparent, in a focal volume about each said point (1) with an intensity high enough to cause the bulk confined within the focal volume to non-linearly absorb energy from the laser pulses and (2) at a rate that delivers the energy of the laser pulses into the focal volume faster than it can diffuse out of the focal volume so as to produce a controlled source of heat in the focal volume about each said point to cause alteration of a region of the bulk having a volume greater than the focal volume about each said point.

In accord with another inventive aspect of the present invention, apparatus for thermal 3-D micromachining of a photonic structure is disclosed that comprises a laser system including an oscillator producing a train of laser pulses; a substrate holder adapted to receive a substrate having a bulk to be micromachined transparent to said laser pulses; and means, coupled to said laser system and cooperative with the substrate holder, for directing said train of laser pulses in a focal volume about each of different points in the bulk (1) with an intensity high enough to cause the bulk confined within the focal volume about each said point to non-linearly absorb energy from the laser pulses and (2) at a rate that delivers the energy of the laser pulses into the focal volume faster than it can diffuse out of the focal volume so as to produce a controlled source of heat in the focal volume about each said point to cause a predetermined alteration of a region of the bulk having a volume greater than the focal volume about each said point.

In accord with another inventive aspect of the present invention, photonic structures are disclosed that are thermally micromachined in 3-D by the steps comprising defining points in the bulk of a substrate to be micromachined; and directing a train of laser pulses, with a wavelength to which the substrate is transparent, in a focal volume about each said point with (1) an intensity high enough to cause the bulk confined within the focal volume to non-linearly absorb energy from the laser pulses and (2) at a rate that delivers the energy of the laser pulses into the focal volume faster than it can diffuse out of the focal volume to cause alteration of a region of the bulk with volume greater than the focal volume about each said point.

In accord with another inventive aspect of the present invention, apparatus for 3-D thermal micromachining of a photonic structure is disclosed that comprises a substrate holder adapted to receive a substrate having a bulk to be micromachined; means for depositing laser energy by non-linear absorption into a focal volume about each point of the bulk of the substrate to be micromachined at a rate greater than the rate that it diffuses thereout to produce a point source of heat in a region of the bulk larger than the focal volume about each point that structurally alters the region of the bulk larger than the focal volume about each point; and means for translating the point source of heat thereby provided point-to-point along any linear and non-linear path to fabricate photonic structures in the bulk of the substrate.

In the presently preferred thermal 3-D micromachining embodiments, the substrate is glass, and the controlled source of heat alters the refractive index of the glass substrate, although an alteration other than structural alteration, such as chemical alteration, or some other alteration, could be caused in chemical substrates, or other substrates, without departing from the inventive concepts.

In the presently preferred thermal 3-D micromachining embodiments, an unamplified laser system is employed that produces femtosecond pulses at a MHz repetition rate, although an unamplified laser system operative at other repetition rates and/or pulse widths could be employed without departing from the inventive concepts. An unamplified femtosecond laser system is more reliable, less expensive and simpler to operate than the heretofore known amplified femtosecond lasers employed for femtosecond laser micromachining. The unamplified laser system, in addition, operates at a megahertz repetition rate, which provides enhanced processing and device fabrication efficiencies.

In the presently preferred thermal 3-D micromachining embodiments, optical waveguides, and optical beamsplitters are thermally micromachined in 3-D in the bulk of a glass substrate, although other passive and active optical devices such as 3-D splitters, wavelength selective splitters, unidirectional couplers, Fiber Bragg gratings, tapers, waveguide amplifiers, and monolithic opto- and optoelectronic-integrated devices or other photonic or photoelectronic structures could be thermally micromachined without departing from the inventive concepts.

In the presently preferred thermal 3-D micromachining optical waveguide and beamsplitter embodiments, the substrate holder is moved generally transversely to the optical path of the train of laser pulses, although other relative displacement methods to trace linear and non-linear paths could be employed without departing from the inventive concepts. This transverse motion enables to provide truly 3-D micromachining of photonic structures of generally uniform cross-section in the bulk of the substrate in a manner not limited by the linear micromachining required by the axial motion of the heretofore known bulk laser micromachining techniques.

In the presently preferred thermal 3-D micromachining optical waveguide and beamsplitter embodiments, the total number of pulses incident to each of the points to be micromachined is controlled to select the optical mode supported by the optical waveguide or beamsplitter fabricated, although the total number of pulses incident to each of the points to be micromachined could be otherwise controlled to select the mode of other photonic structures fabricated or other profile without departing from the inventive concepts. In the presently preferred solely exemplary waveguide embodiments, the total number of pulses incident to each of the points to be micromachined is controlled by varying the rate which the train of laser pulses of a given repetition rate scans the points to be micromachined, although the total number of pulses may be controlled by varying the repetition rate of the pulse train and/or the scan rate without departing from the inventive concepts. In the solely exemplary waveguide embodiments, control of the scan rate enables to select waveguides that are single-mode at 1550 nm and multiple-mode.

BRIEF DESCRIPTION OF THE DRAWINGS

These and other objects, inventive aspects and advantageous features of the present invention will become apparent as the invention becomes better understood by those of skill in the art by referring to the following solely exemplary, detailed description of the presently preferred embodiments thereof, and to the drawings, wherein:

FIG. 3A is an optical micrograph illustrating structures produced in accord with the present invention by different numbers of femtosecond laser pulses, while

FIG. 6 in the FIGS. 6A, 6B, and 6C thereof are CCD images of optical modes, and in the FIGS. 6D, 6E, and 6F thereof are graphs of refractive index profiles, of exemplary waveguides micromachined in accord with the present invention.

DETAILED DESCRIPTION OF THE PRESENTLY PREFERRED EMBODIMENTS

Figure 1A:
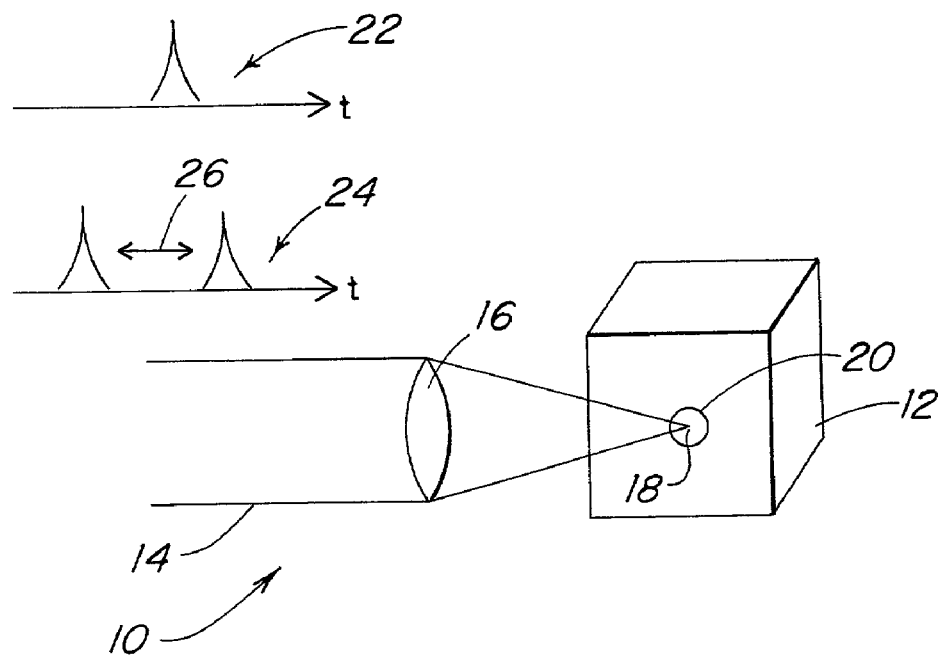
FIG. 1A is a pictorial diagram illustrating the heretofore known laser bulk micromachining techniques.

Referring now to FIG. 1A, generally designated at 10 is a pictorial diagram illustrating the heretofore known laser bulk micromachining techniques. A substrate 12 having a bulk to be micromachined is illuminated by a laser beam schematically illustrated by lines 14 which is focused by optics 16 to a preselected point 18 within the bulk of the substrate 12. The laser wavelength is chosen so that the material is transparent to the laser beam. The intensity of the laser 14 focused to the point 18 within the bulk of the substrate is selected to be high enough that laser energy is non-linearly absorbed within and structurally alters the region of the bulk within the focal volume schematically illustrated 20. In one single-pulse operating regime heretofore known generally designated 22, the energy of the single pulse is selected high enough to produce a microexplosion within the focal volume that creates a voxel within the focal volume 20 at each point 18 as described in U.S. Pat. No. 5,761,111 to Glezer, incorporated herein by reference, and in the above-identified Glezer articles. These voxels are either hollow voids inside the material or contain less-dense material and are formed by an explosive mechanism whereby hot plasma formed in the focal volume by the laser pulse explosively expands into the surrounding material. In another single-pulse operating regime, the energy of the single pulse is lower than that required to form a voxel within the focal volume, but still high enough that sufficient laser energy is nonlinearly absorbed to cause material alteration. Material and refractive index changes more subtle than that of the voxel are produced in the focal volume 20. The exact mechanism for inducing material and refractive index changes is currently not known although likely candidates include localized melting and resolidification, color center formation and/or a mechanism analogous to ultraviolet densification.

In a multiple-pulse regime heretofore known generally designated 24, each of multiple pulses that follow each other by a time 26 greater than the time required for energy deposited in the focal volume to diffuse into the bulk of the substrate produces a refractive index change within the focal volume 20 about each point 18 according to one of the two single-pulse regimes discussed above. Multiple pulses incident on one spot in the sample amplify the effect of single pulses, producing larger material changes, and as described in the above-identified Davis et al., Miura et al., and Homoelle et al. articles, continuous scanning of the laser focus inside the material connects the refractive index changed regions, forming an optical waveguide or other structure. In the heretofore known multiple-pulse operating regime, however, structural change is produced only in the focal volume 20 about each point 18 in the bulk of the substrate 12, and multiple pulses do not substantially heat material outside the focal volume because the energy deposited by each pulse diffuses out of the focal volume before the next pulse arrives, and therefore no accumulation of thermal energy can occur.

Figure 1B:
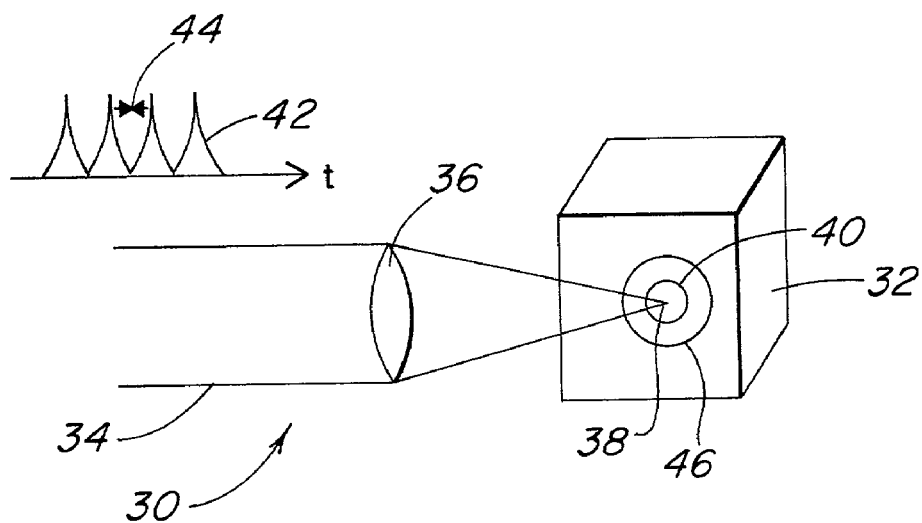
FIG. 1B is a pictorial diagram useful in explaining the principles of the present invention.

Referring now to FIG. 1B, generally designated at 30 is a pictorial diagram useful in explaining the principles of the present invention. A substrate 32 having a bulk to be micromachined is illuminated by a laser beam schematically illustrated by lines 34 which is focused by optics 36 to a preselected point 38 within the bulk of the substrate 32. The intensity of the laser beam 34 focused to the point 38 within the bulk of the substrate is selected to be high enough that laser energy is non-linearly absorbed within the region of the bulk at the focal volume schematically illustrated 40, but, unlike the heretofore known multiple-pulse operating regime described above in connection with the description of FIG. 1A, each of multiple pulses 42 follow each other by a time schematically illustrated at 44 less than the time required for energy deposited by one pulse in the focal volume to thermally diffuse out of the focal volume into the bulk of the substrate. As a result, each of the multiple pulses cooperates with the others to provide a controlled point source of heat in the focal volume 40 about each point 38 that alters a region 46 of the bulk with volume greater than the focal volume 40 about each point 38. This cumulative thermal effect in accord with the present invention is believed to alter the region 46 of the bulk with volume greater than the focal volume 40 by localized melting and resolidification of the material around the focal volume. In the exemplary embodiments described hereinbelow, the controlled point source of heat causes structural alteration and refractive index change of a glass substrate to provide an optical waveguide in some embodiments and an optical beamsplitter in other embodiments, although other alteration of the bulk with volume greater than the focal volume of other substrates in other embodiments will become readily apparent to those of skill in the art without departing from the inventive concepts. For example, the present invention may be employed to thermally micromachine optical waveguides in polymer photoresists of PC boards so that data can be sent between different chips via optical pulses instead of electrical ones.

Figure 2A:
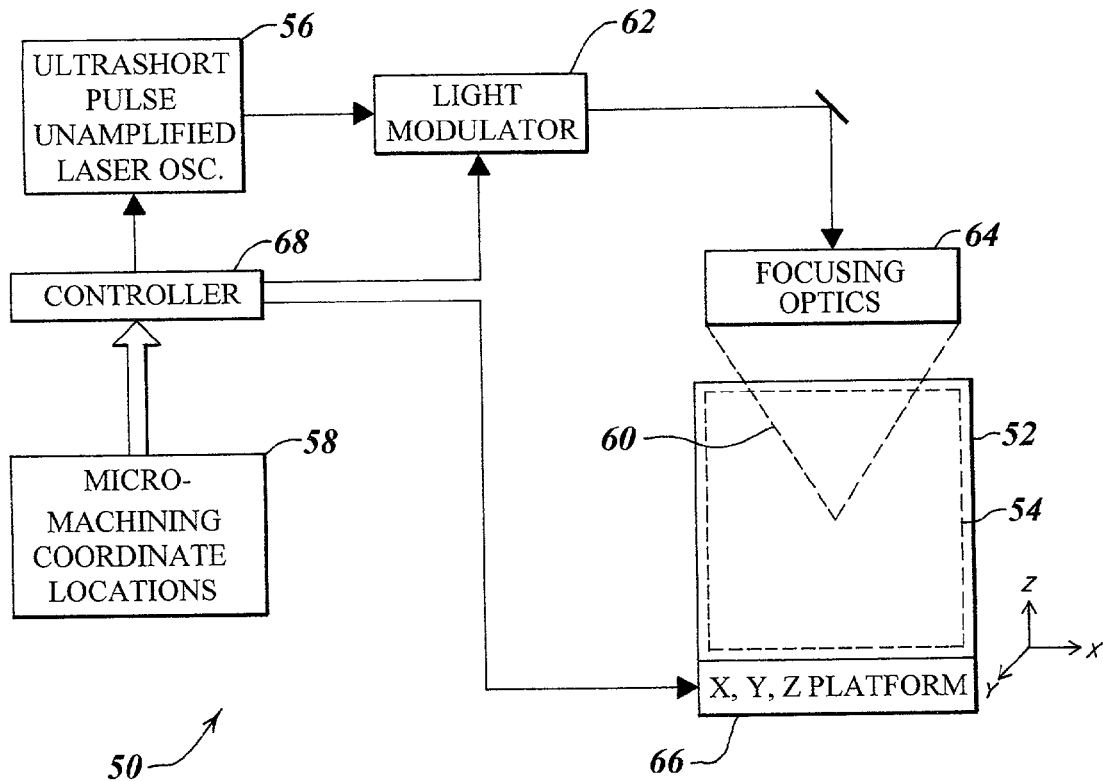
FIG. 2A is a block diagram of apparatus in accord with the present invention.

Referring now to FIG. 2A, generally designated at 50 is a block diagram of apparatus in accord with the present invention. The apparatus 50 includes a transparent substrate 52 having a material-dependent band gap energy and a bulk or internal volume schematically illustrated by dashed line 54. Any transparent substrate material, such as a solid, a liquid or a gas that may be composite or single can be employed without departing from the inventive concepts. In a solid material, permanent refractive index or other material changes can be produced, allowing a device to be micromachined. In liquids or gases, the point source of heat can be used to other ends as will be readily appreciated by those of skill in the art.

An unamplified ultrashort pulse laser system 56 to be described provides a laser beam with a photon energy selected to be less than the band gap energy of the substrate 52 so that the material is transparent to the beam. Although an unamplified femtosecond laser system is preferred, other laser systems, either continuous-wave or pulsed, with a photon energy (wavelength) in the visible, infrared (IR) and ultraviolet (UV), that are amplified or unamplified and have other than ultrashort pulses may be employed without departing from the inventive concepts.

Figure 2B:
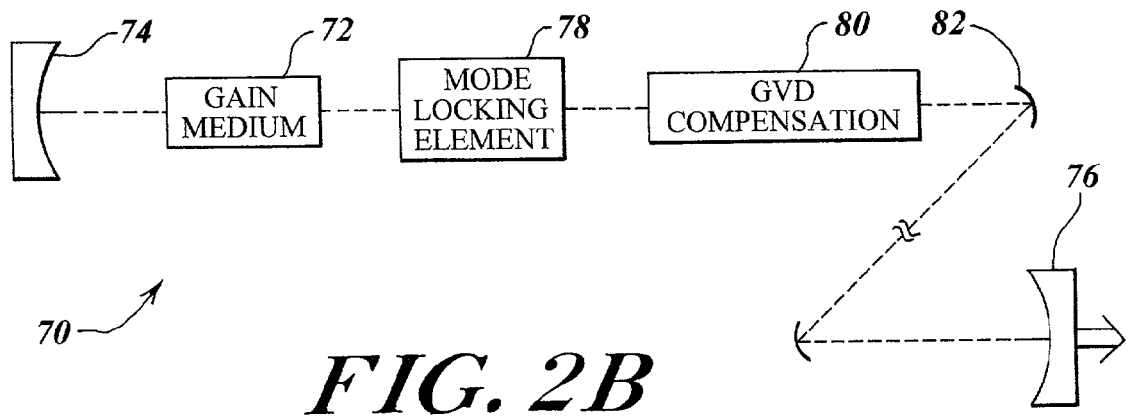
FIG. 2B is a block diagram of an unamplified laser system of the apparatus of the FIG. 2A.

Referring now briefly to FIG. 2B, generally designated at 70 is a block diagram of the ultrashort unamplified pulse laser system of FIG. 2A. In order for a laser to produce ultrashort pulses (in a few femtosecond to the few picosecond range) there are several essential requirements. The first is that the gain medium 72 of the laser 70, be it a solid medium, a dye-based solution, a semiconductor, or other lasing medium, must have a relatively broad gain bandwidth. The broad gain bandwidth is necessary so that a sufficient range of frequencies is available to lase simultaneously, with an appropriate phase relationship between them, so that their superposition produces a pulse much shorter than the length of the laser cavity formed by mirrors 74, 76. A mode-locking element 78 is provided to ensure the correct phase relationship between the frequencies (modes). Active mode-locking with an electrically-driven modulator is usually not sufficient to produce ultrashort pulses. Mode locking may be generally accomplished by some type of passive element such as a saturable absorber, which can be a real absorbing element whose absorption is saturated at high intensity, or, for example, by the combination of a self-focusing element together with an aperture, to provide an effect equivalent to a very fast saturable absorber, known as Kerr-Lens modelocking (KLM). To produce the shortest pulses, a mechanism 80 is provided for canceling the group velocity dispersion (GVD) in the cavity. GVD compensation is necessary to obtain the shortest possible pulses. GVD can be compensated with a set of properly arranged prisms, or by specially coated mirrors providing the desired frequency-dependent phase-delay. For the exemplary optical waveguide and optical beamsplitter embodiments in accord with the present invention described hereinbelow, an unamplified Ti:Sapphire laser producing sub-100-fs pulses at a wavelength of 800-nm was used. A one-to-one imaging telescope 82 based on a two (2) meter radius of curvature mirror is inserted into the laser cavity. Without the telescope 82, the laser runs at a repetition rate of one hundred (100) MHz and produces output pulse energies of a few nJ. With the telescope 82, the laser runs at a repetition rate of twenty-five (25) MHz with output pulse energies of 15-20 nJ. The higher pulse energy is a result of more gain building up in the laser crystal because pulses come by to sweep this gain away less frequently. Reference may be had in this connection to an article by Cho et al., entitled "A 7.2 MHz High Power KLM Ti:Al$_2$O$_3$ Laser Using Multiple Pass Long Cavity and Saturable Bragg Reflector," appearing at Technical Digest: Conference on Lasers and Electro Optics 469 (1999), to an article by Libertun et al., entitled "A 36 nJ-15.5 MHz Extended-Cavity Ti:Sapphire Oscillator," appearing at Technical Digest: Conference on Lasers and Electro Optics 99, 469 (1999), and to these further articles by Cho et al., "A 15-MHz High Peak Power KLM Ti:Al$_2$O$_3$ Laser Using Multiple-Pass Long Cavity," Technical Digest: Conference on Lasers and Electro-Optics 364 (1998), "Low-Repetition Rate High-Peak-Power Kerr-Lens Mode-Locked Ti:Al$_2$O$_3$ Laser with a Multiple-Pass Cavity," Optics Letters 24, 417 (1999), and "Generation of 90-nJ Pulses with a 4 MHz Repetition-Rate Kerr-Lens Mode-Locked Ti:Al$_2$O$_3$ Laser Operating with Net Positive and Negative Intracavity Dispersion," Optics Letters 26, 560 (2001), each incorporated herein by reference.

Returning now to FIG. 2A, coordinate locations as schematically shown by a block 58 are defined that correspond to points within the bulk of the substrate to be thermally processed or micromachined. The coordinate locations may be overlapping or spaced apart in any desired one (1), two (2), or three (3) dimensional geometry without departing from the inventive concepts.

As shown by intersecting dashed lines 60, the laser beam provided by the unamplified ultrashort pulse laser system 56 is focused inside the bulk 54 of the substrate 52 along an optical path that includes a light modulator 62 and focusing optics 64. A mechanical, electro-optic, or acousto-optic shutter may be employed for the light modulator 62. The focusing optics may generally be comprised by a refractive objective or comprised by a reflecting objective, such as a compound objective, aspheric lens, parabolic reflector, or other focusing system.

An X, Y, Z translation platform 66 coupled to the substrate 52 enables the laser beam to deposit energy at the different coordinate locations 58 specified in the bulk 54 of the substrate 52. Although an X, Y, Z translation platform 66 is illustrated, it will be appreciated that the ultrashort pulse laser write beam and the substrate 52 may be otherwise relatively displaced without departing from the inventive concepts.

A controller 68 coupled to the ultrashort pulse unamplified laser oscillator 56, light modulator 62 and platform 66 and responsive to the coordinate locations 58 is operative to deposit the energy of multiple pulses within the focal volume at each of the coordinate locations at a rate faster than it can thermally diffuse out of the focal volume to provide a controlled source of heat in the focal volume of the laser pulses to cause alteration, either structural, chemical, or some other alteration, of a region of the bulk with volume greater than the focal volume about each coordinate location. By translating the platform 66, in effect, the cumulative point source of heat is controllably dragged through the bulk to respectively alter the region of the bulk with volume larger than the focal volume about each coordinate location as it traces any linear and non-linear path.

Each of the multiple, ultrashort laser pulses is nonlinearly absorbed inside the focal volume of the transparent material, depositing laser energy into the focal volume. Although nonlinear absorption by the mechanisms of multi-photon ionization, tunneling and avalanche ionization leading to optical breakdown and plasma formation inside the focal volume in the bulk of the material is presently preferred, other nonlinear absorption mechanisms (such as two-photon absorption that does not result in optical breakdown and plasma formation) could be employed without departing from the inventive concepts. For a detailed description of the mechanisms of non-linear absorption (multi-photon and avalanche ionization), and for experimentally-observed optical breakdown thresholds in transparent materials, reference may be had to Bloembergen, "Laser-Induced Electric Breakdown In Solids," IEEE Journal of Quantum Electronics, QE-10, 375 (1974) for nanosecond pulse widths, incorporated herein by reference; and to the article by Du et al., the article by Stuart, et al., the article by Lenzner, et al., supra; and to Stewart et al., "Laser-Induced Damage in Dielectrics with Nanosecond to Sub-Picosecond Pulses," Phys. Rev. Lett. 74, 2248 (1995), for picosecond and femtosecond pulse widths, each incorporated herein by reference.

The energy of the multiple pulses delivered into the focal volume at a rate faster than the energy can diffuse out of the focal volume produces a cumulative heating of the material around the focal volume, providing a controlled point source of heat that controllably alters a region of the bulk with volume larger than the focal volume about each coordinate location. The energy of each pulse both heats the material in the locale of the focal volume and tends to diffuse out of the focal volume. However, the next pulse in accord with the present invention is delivered at a time before the energy can thermally diffuse out of the focal volume, so that the substrate is still hot when each next pulse arrives. This leads to an accumulation of heat in the focal volume that controllably alters the region of the substrate with volume larger than the focal volume about each coordinate location. The material melts or is otherwise modified in the volume around the laser focus where the temperature produced by the controlled heat source exceeds the melting or other transition temperature for the material. In the case of solid substrates where the material is melted by the heat source, because of temperature gradients, the melted material of the bulk resolidifies upon cooling non-uniformly producing density and refractive index changes; for example, hotter regions become denser because they cool more slowly while cooler regions quench to low-density more quickly. For the structural alteration produced in the exemplary optical waveguide and beamsplitter embodiments described hereinbelow, the melting of the bulk in the region larger than the focal volume and its non-uniform resolidification leads to small density variations and corresponding refractive index changes in the region surrounding the focal volume of the glass substrate. Reference may be had to an article by Herman et al., entitled "Laser Micromachining of Transparent Fused Silica with 1-ps Pulses and Pulse Trains," appearing at Proc. SPIE. 3616, 148 (1999), incorporated herein by reference, for a description of the mechanisms of surface ablation and drilling with high repetition rate pulse trains.

In accord with the present invention, the laser energy, duration and spot size inside the substrate are co-variables selected to produce laser intensity sufficient to induce non-linear absorption in the focal volume. Any combination of laser energy, spot size and duration sufficient to provide non-linear absorption is contemplated. To produce a cumulative thermal effect in accord with the present invention, this laser energy, deposited by non-linear absorption in the focal volume, is delivered at a rate faster than the rate at which energy is carried out of the focal volume by thermal diffusion. In general, as will be appreciated by those of skill in the art, the thermal diffusion time will vary with the volume of material heated and the thermal conductivity of the substrate selected. Any energy deposition rate faster than the energy is carried out of the focal volume by thermal diffusion or other mechanism may be employed without departing from the inventive concepts.

Any number of pulses that produces a controlled point source of heat that heats a region of the bulk greater than the focal volume about each coordinate location to provide controlled alteration of said region of the bulk may be employed without departing from the inventive concepts. By adjusting the number of laser pulses incident on one spot, the amount of thermal energy deposited per unit volume can be controlled with nanojoule precision. In general, as will be appreciated by those of skill in the art, the greater the number of pulses, the larger is the region of the bulk about the focal volume at each coordinate location made subject to the controlled point source of heat. As appears more fully below in connection with the description of FIG. 6, the total number of pulses is controlled to select the mode supported by the exemplary waveguides micromachined in accord with the present invention. In the exemplary waveguide and beamsplitter embodiments described hereinbelow, a 1.4 NA focusing objective was employed, which provides a generally spherical focal volume with transverse diameter of approximately 0.5 microns and axial length of about 0.8 microns. The controlled point source of heat larger than the focal volume about each point to be micromachined produced in accord with the present invention is also of generally spherical shape. In fact, because the thermally affected region is significantly larger than the focal volume, thermal diffusion tends to wash out any asymmetry introduced by the slight asymmetry of the focal volume. Because its cross-section is uniform, the controlled point source of heat in accord with the present invention enables writing of waveguides, beamsplitters and other photonic structures of uniform cross-section without regard to translation direction as it is dragged to trace any linear and non-linear path in the bulk of the substrate to be micromachined.

Figure 3A:
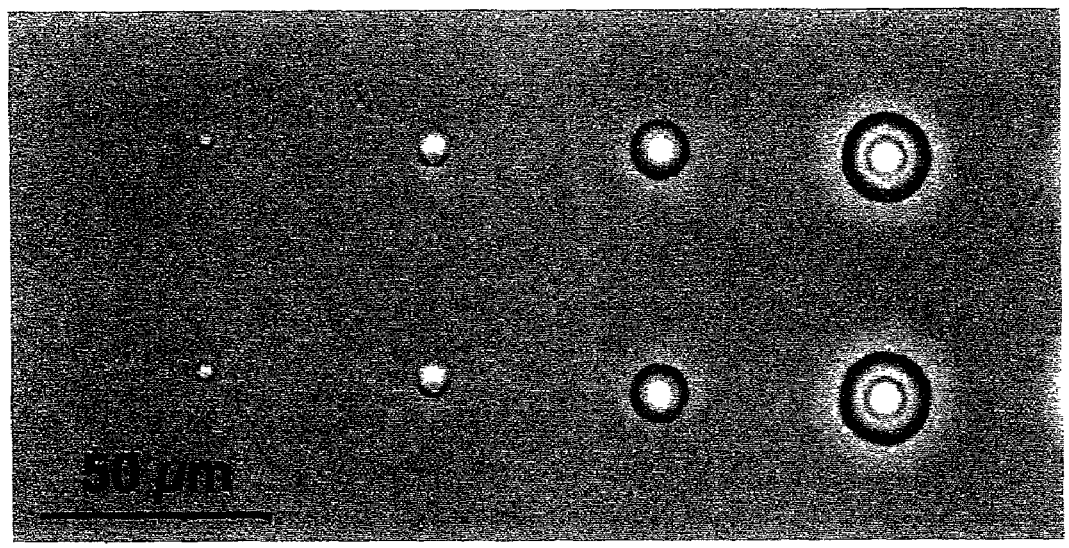

Referring now to FIG. 3A, generally designated at 90 is an optical micrograph illustrating structures produced in accord with the present invention respectively by different numbers of pulses. The structures 90 in Corning "0211" glass were produced using 30-fs laser pulses from a 25-MHz laser with 5-nJ energy focused by a 1.4 numerical aperture (NA) oil-immersion microscope objective. Each structure illustrated was made with a different number of incident laser pulses. The laser pulse train was incident perpendicular to the plane of the image. The number of incident pulses increases, by factors of ten (10), from $10^2$ on left of the FIG. to $10^5$ on the right of the FIG.. The size of the structures illustrated is much larger than the focal volume of the objective, and the size of the structures increases with increasing number of laser pulses. Side-view microscopy reveals that the structures are spherical in shape, not shown. There is a series of rings evident in the structures to the right of the FIG., which is believed to indicate regions in the structure with different refractive index.

The structures illustrated are believed to be produced by a cumulative heating of the material around the laser focus by many successive laser pulses followed by non-uniform resolidification. See, for example, the first, fourth, and fifth articles by Schaffer, et al., supra, and the additional Schaffer et al. article entitled "Morphology and Mechanisms of Femtosecond Laser-Induced Structural Change in Bulk Transparent Materials," Technical Digest: Conference on Lasers and Electro-Optics 445 (2001), each incorporated herein by reference. Because the time between successive pulses, at 40-ns, is much shorter than the characteristic time for thermal diffusion out of the focal volume, the train of pulses heats the material around the focal volume. Over many pulses a volume of material much larger than the focal volume is heated above the melting temperature for the glass. The larger the number of incident laser pulses, the larger the radius out to which the glass melts. After the pulse train is turned off, the material cools and, because of the temperature gradients, resolidifies non-uniformly, leading to the optical contrast illustrated in the FIG.. The size of the structures seems to stop growing after about $10^7$ pulses. At that point, the structure itself is believed to disturb the laser focus enough that the intensity drops below the threshold intensity for nonlinear absorption and therefore no further energy deposition occurs.

A non-thermal mechanism cannot account for the structures illustrated in the FIG. First, the laser pulse train never directly irradiates most of the material where refractive index changes are observed. Only the sub-micrometer-sized focal volume at the center of the structure is directly irradiated, whereas the structures illustrated extend up to ten (10) microns from the focal spot. Second, the size of the structure increases with the number of incident laser pulses, indicating that as more pulses deposit more energy, a larger region melts.

Figure 3B:
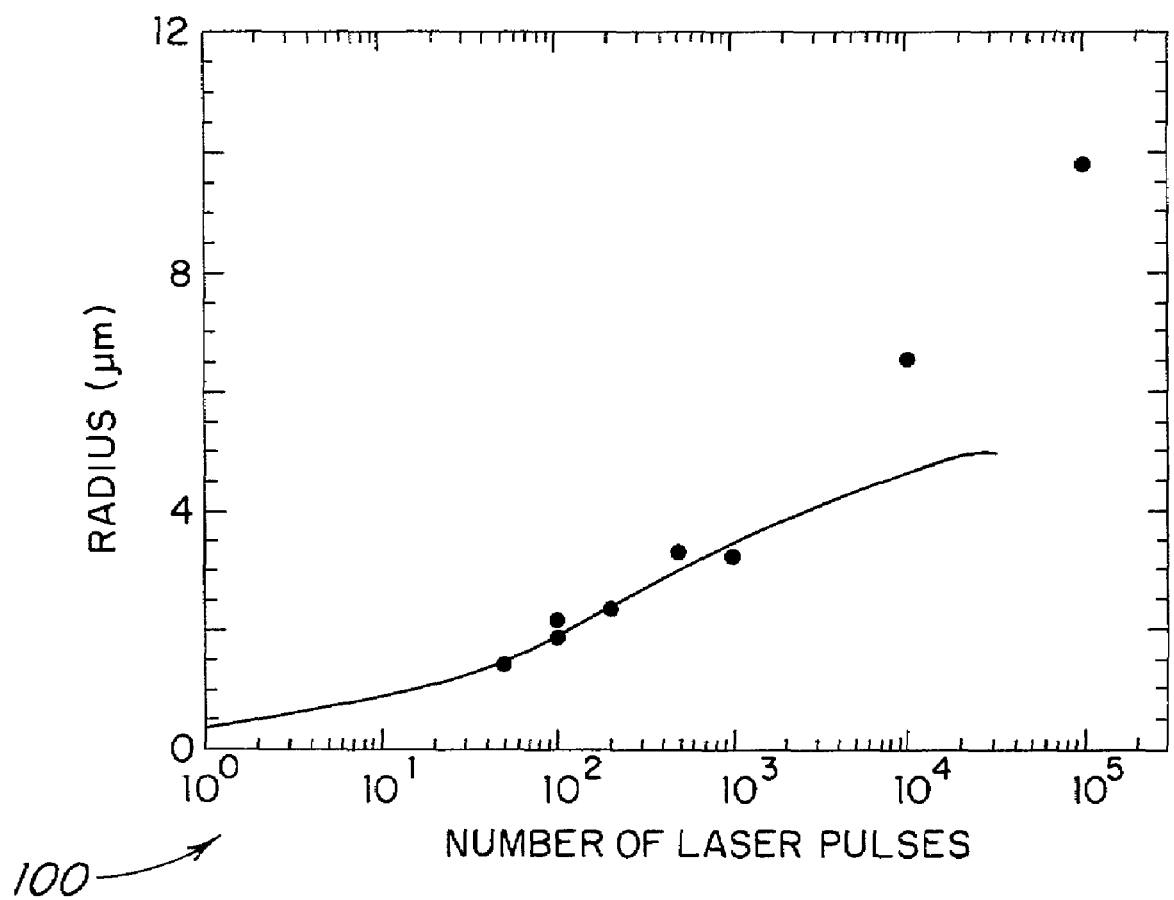
FIG. 3B is a graph that plots the radius of the structures produced as a function of the number of incident laser pulses.

The cumulative heating effect was modeled using a thermal diffusion equation well-known to those of skill in the art. The maximum radius out to which the temperature exceeds the melting temperature for the glass was calculated for different numbers of incident laser pulses. Energy deposition by the laser was modeled as a series of heat sources that are delta functions in time and are spherical in shape with a volume equal to that of the focal volume for the objective used. The only free parameter was the fraction of each laser pulse absorbed by the material. The model best fit the data with thirty (30) percent absorption, which is consistent with the transmission of the laser pulse slightly above the threshold for permanent structural change. As shown generally at 100 in FIG. 3B, the model, represented by the line in the FIG., fits the data very well up to about one thousand (1000) laser pulses, after which the model underestimates the size of the affected region. This discrepancy is most likely due to the decrease in the thermal conductivity of the glass as it heats and melts.

Exemplary Embodiments

Figure 4A:
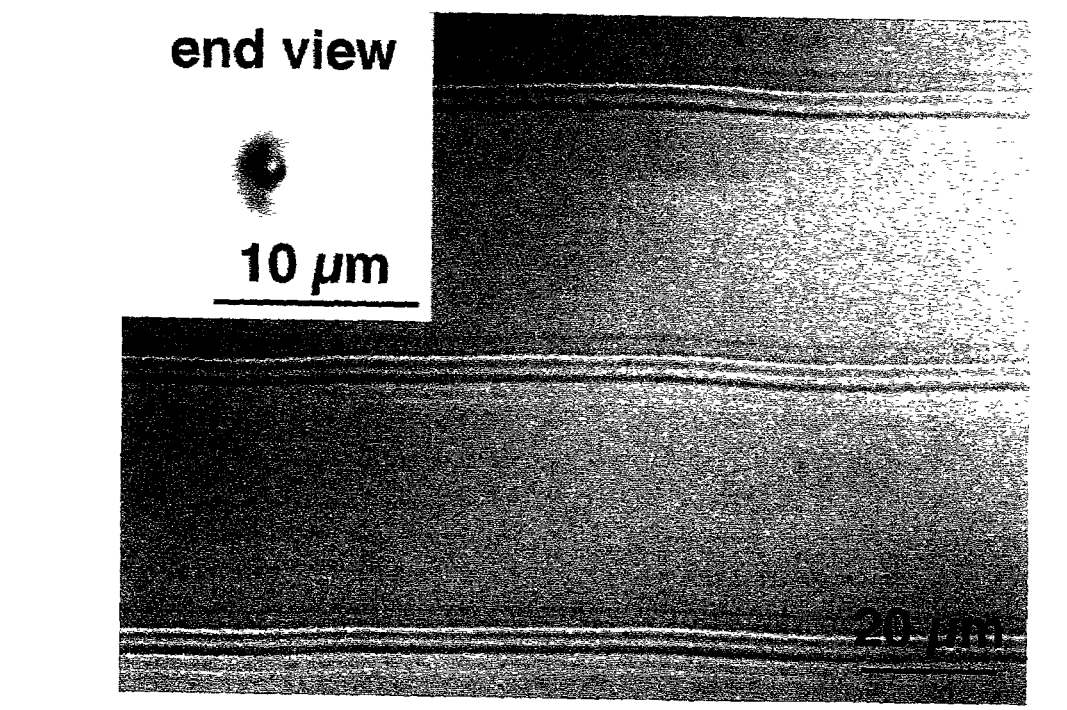
FIGS. 4A and 4B respectively are an optical micrograph of exemplary optical waveguides and a near-field output profile thereof micromachined in accord with the present invention.

For the exemplary optical waveguide and beamsplitter embodiments described below in connection with the description of FIGS. 4 and 5, the laser pulse had a duration of less than one hundred (100) fs. The laser was focused by a 1.4-NA oil-immersion microscope objective to a spot size of less than 0.5 micrometers in a borosilicate glass (Corning 0211). A prism compressor as described in an article by Fittinghoff, et al., "Collinear Type II Second-Harmonic-Generation Frequency-Resolved Optical Gating for Use with High-Numerical-Aperture Objectives" appearing at Opt. Lett. 23, 1046 (1998), incorporated herein by reference, was employed to minimize the energy threshold for producing structural change with the 40-nm frequency bandwidth pulses from the 25-MHz oscillator. The energy delivered to the glass was about five (5) nJ, after losses in the optics and other components. The energy directly from the laser was 15-nJ and the repetition rate of the pulses was twenty-five (25) MHz giving a pulse-to-pulse separation time of forty (40) ns. This pulse energy, spot size and duration were sufficient to cause non-linear absorption in the Corning "0211" borosilicate glass. The time scale for thermal diffusion out of the focal volume of the 1.4-NA objective is about one (1) microsecond in that substrate. The forty (40) ns pulse-to-pulse separation time is short enough to deposit energy at a rate faster than it is carried out of the focal volume by thermal diffusion FIG. 4A shows an optical micrograph generally designated 110 of exemplary optical waveguides in accord with the present invention. The illustrated waveguides each include a cylindrical structure written inside Corning "0211" glass by translating the substrate at twenty (20) mm/s perpendicular to an incident twenty-five (25) MHz train of 5-nJ, sub-100-fs laser pulses focused with a 1.4-NA microscope objective. Each coordinate location, defined by the focal volume of the objective, was irradiated with about six hundred twenty five (625) pulses. The insert in FIG. 4A is an optical micrograph that shows an end view of one of these waveguides after cleaving the glass to produce a clean face.

Figure 4B:
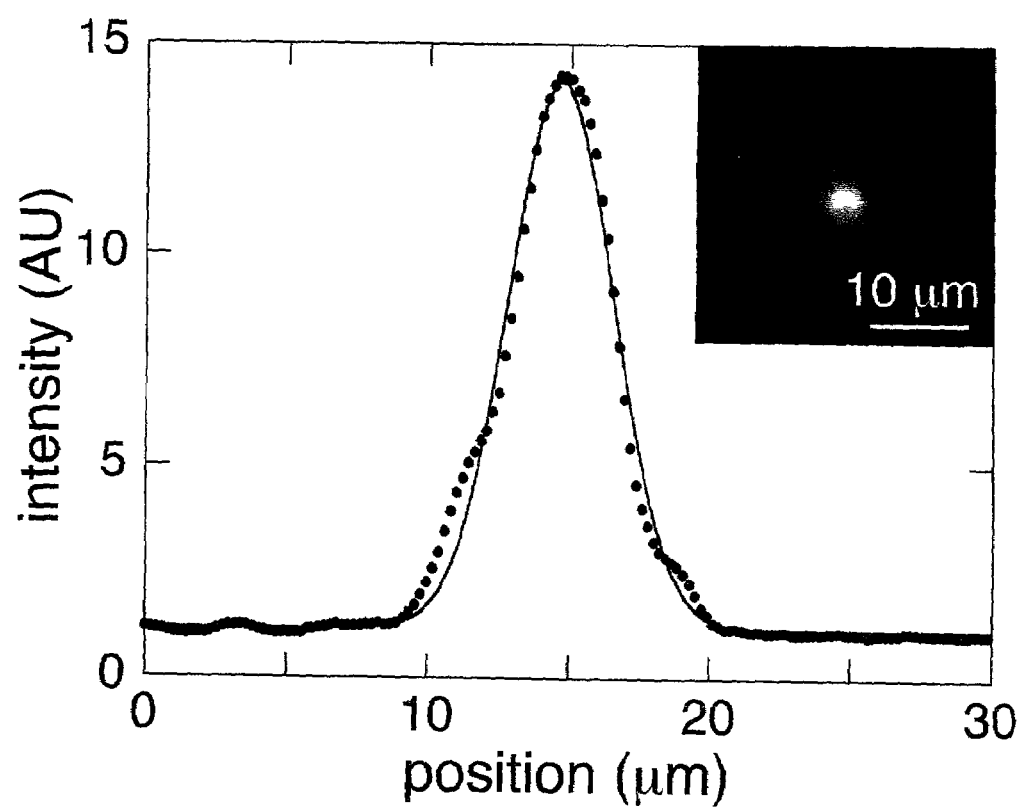

FIG. 4B shows a line out of the near-field output profile generally designated 120 of one of these waveguides for 633-nm laser light. As the data show, the waveguide has a single-mode, near-Gaussian output profile for visible wavelengths. The insert shows the raw CCD image of the near-field mode.

Figure 5:
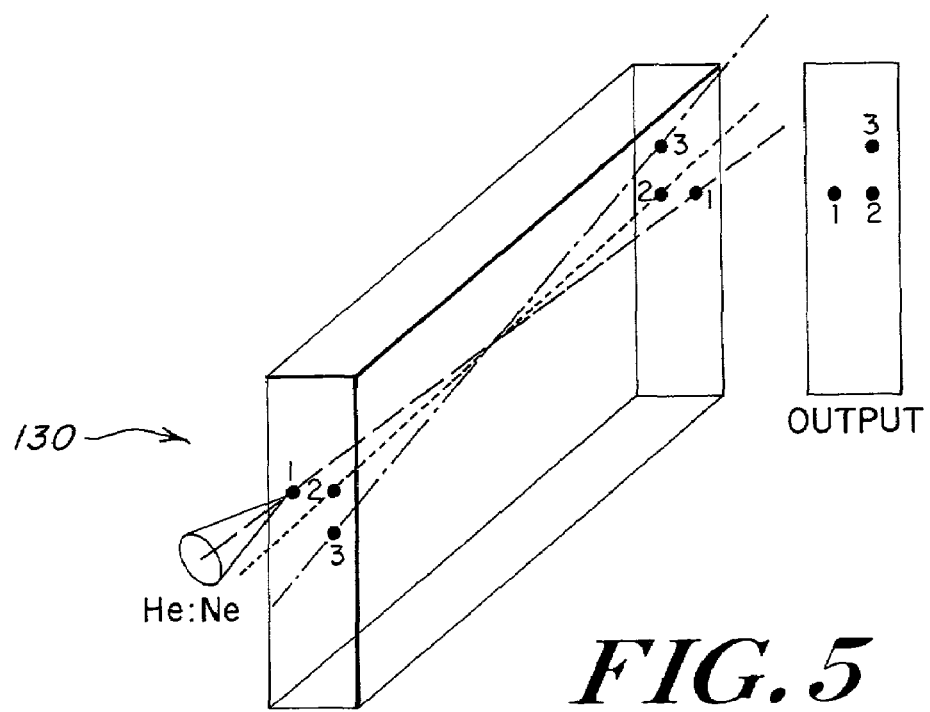
FIGS. 5 is a pictorial diagram of an exemplary optical beamsplitter micromachined in accord with the present invention.

FIG. 5 is a pictorial diagram of an exemplary optical beamsplitter generally designated 130 in accord with the present invention. The three-dimensional waveguide splitter 130 is micromachined in the bulk of a glass substrate by intersecting three waveguides, each written according to the techniques described hereinabove. Some of the light coupled into one of the waveguides leaks to the other two at their intersection, making a waveguide beamsplitter. Because the three (3) waveguides do not all lie in the same plane, it is very difficult to fabricate such a splitter using conventional, photolithographic techniques. The optical beam splitter 130 has three (3), equal-intensity outputs.

FIG. 6 shows refractive index profiles of the cross-sections of optical waveguides fifty (50) mm long produced in a Corning "0215" glass slide with a 25 MHz long-cavity Ti:Sapphire oscillator operating at 800-nm produced at different translation speeds, as well as the resulting near-field modes of laser light coupled into the guides. A 1.4 NA oil-immersion objective was employed. Pulse energy delivered to the sample was ten (10) nJ in a 55-fs pulse. The total number of pulses incident in the focal volume about a point to be micromachined is determined by the pulse repetition rate of the laser system and by the scan rate. We controlled the total number of pulses incident by varying the scan rate to select the transverse size of the structure to be micromachined, its transverse index profile, and hence the optical mode supported by, the waveguide micromachined. Although we held the repetition rate of the laser fixed while varying the scan rate to select the optical mode supported by the waveguide micromachined, it will be appreciated by those skill in the art that the combination of varying the repetition rate of the laser and/or varying the scan rate can be employed to select the optical mode supported by the waveguide or other photonic structure to be micromachined without departing from the inventive concepts. FIGS. 6A, B, C show the near-field mode of 1550-nm laser light coupled into waveguides fabricated by translating the sample at twenty (20), ten (10), and five (5) mm/s respectably (cross shows mode centroid). FIGS. 6D, E, F show refractive index profiles obtained using the refractive near-field technique of each of these waveguides. As can be seen from the Figure, single-mode propagation is obtained for the waveguide fabricated at the highest translation speeds (20 mm/s); the waveguides made at each of the lower speeds produced a doughnut-shaped mode. For the waveguides machined at twenty (20) mm/s, the refractive near-field technique shows that the index increase of the central core, where single-mode guiding occurs, is about $(2\times10^{-3})$. Reference in this connection may be had to an article by Ashcom et al., entitled "Laser Induced Microexplosions and Applications in Laser Micromachining," to be presented at the 13th International Conference on Ultrafast Phenomenon (May 2002), incorporated herein by reference.

Many modifications of the presently disclosed invention will become apparent to those of skill in the art having benefited by the instant disclosure without departing from the inventive concepts. For example, the controlled point source of heat produced in accord with the present invention may be advantageously employed in combination with the heretofore known laser micromachining techniques to fabricate devices.

What is claimed is:

1. A method for thermal micromachining of a photonic structure, comprising the steps of:

focusing a train of laser pulses, with a wavelength to which a substrate is transparent, into a volume of the substrate with an intensity high enough to cause the bulk confined within the volume to non-linearly absorb energy from the laser pulses and at a rate that delivers the energy of the laser pulses into the volume faster than it can diffuse out of the volume, and wherein the train comprises two or more pulses and the pulses are delivered at an energy and delivery rate such that the pulses cooperatively deposit energy in the volume so as to produce a source of heat to cause an increase in density and in the index of refraction within a region of the bulk that includes said volume.

2. The thermal micromachining method of claim 1, wherein said refractive index change occurs in the region of the bulk greater than the volume into which the pulses are focused.

3. The thermal micromachining method of claim 2, wherein said substrate is glass.

4. The thermal micromachining method of claim 2, further including the step of controlling the total number of pulses incident to said volume to select an optical mode supported by the photonic structure micromachined.

5. The thermal micromachining method of claim 1, wherein each of said pulses of said train of laser pulses is a femtosecond laser pulse.

6. The thermal micromachining method of claim 5, wherein a total number of pulses incident to said volume is controlled by varying a repetition rate of the train of laser pulses.

7. A method of forming a three-dimensional photonic structure within the bulk of a substrate, comprising focusing a plurality of laser pulses into a volume within a substrate, said pulses having a sufficiently high intensity to be non-linearly absorbed by the substrate to deposit energy therein, wherein a temporal separation between successive pulses delivered to the volume is sufficiently short such that accumulation of energy cooperatively deposited by two or more pulses causes localized melting of the substrate such that upon termination of said pulses, the melted volume resolidifies into a substrate region having at least a portion that is denser than the non-irradiated portions of the substrate.

8. The method of claim 7, further comprising selecting said pulses to be sub-100-fs pulses.

9. The method of claim 7, further comprising selecting an energy of said pulses to be less than about 20 nJ.

10. A method of forming a three-dimensional photonic structure within the bulk of a substrate, comprising delivering a plurality of femto-second laser pulses to selected volumes within the bulk of a substrate, each pulse having an energy less about 20 nJ and sufficiently high to be non-linearly absorbed by the substrate to deposit energy therein, and wherein a delivery rate of said pulses is sufficiently fast such that the pulses cumulatively produce a source of heat within each irradiated volume so as to cause an increase in density and an index of refraction of a substrate region about the irradiated volume.

\* \* \* \* \*